US008537120B2

(12) United States Patent
Feng et al.

(10) Patent No.: US 8,537,120 B2
(45) Date of Patent: Sep. 17, 2013

(54) FOUR-CORNER CUT SQUARE CHINESE CHARACTER INPUT METHOD BASED ON EXCELLENCE CODE

(75) Inventors: Lin Feng, Guangdong (CN); Chunman Li, Hongkong (CN); Heungyeung Li, Hongkong (CN)

(73) Assignee: Shenzhen Qichuangmei Technology Co., Ltd, Shenzhen, Guangdong (CN)

( * ) Notice: Subject to any disclaimer, the term of this patent is extended or adjusted under 35 U.S.C. 154(b) by 103 days.

(21) Appl. No.: 12/935,002

(22) PCT Filed: Mar. 27, 2009

(86) PCT No.: PCT/CN2009/000334
§ 371 (c)(1),
(2), (4) Date: Dec. 23, 2010

(87) PCT Pub. No.: WO2009/121241
PCT Pub. Date: Oct. 8, 2009

(65) Prior Publication Data
US 2011/0115715 A1 May 19, 2011

Related U.S. Application Data

(60) Provisional application No. 61/081,748, filed on Jul. 18, 2008.

(30) Foreign Application Priority Data

Mar. 31, 2008 (CN) .......................... 2008 1 0066410

(51) Int. Cl.
*G06F 3/02* (2006.01)
*H03M 11/00* (2006.01)

(52) U.S. Cl.
USPC .............................. 345/171; 341/22; 715/700

(58) Field of Classification Search
USPC .............. 345/171, 156; 341/28, 22; 715/700
See application file for complete search history.

(56) References Cited

U.S. PATENT DOCUMENTS

| | | | | |
|---|---|---|---|---|
| 4,559,615 A * | 12/1985 | Goo et al. | ...................... | 715/263 |
| 5,331,557 A * | 7/1994 | Liu | ................ | 715/263 |
| 5,410,306 A * | 4/1995 | Ye | .................... | 341/28 |
| 5,475,767 A * | 12/1995 | Du | .................... | 382/185 |
| 5,790,055 A * | 8/1998 | Yu | .................... | 341/28 |
| 6,075,469 A * | 6/2000 | Pong | ............... | 341/28 |
| 6,349,147 B1 * | 2/2002 | Pong et al. | ..................... | 382/185 |
| 6,362,752 B1 * | 3/2002 | Guo et al. | .................... | 341/28 |
| 6,947,771 B2 * | 9/2005 | Guo et al. | ..................... | 455/566 |
| 6,956,968 B1 * | 10/2005 | O'Dell et al. | ................. | 382/182 |
| 7,656,315 B2 * | 2/2010 | Zhu | ................. | 341/22 |

* cited by examiner

*Primary Examiner* — Amr Awad
*Assistant Examiner* — Roberto Flores

(57) ABSTRACT

A four-corner cut square Chinese character input method based on excellent code comprises the steps of: assigning predesigned code table to corresponding keys of a keyboard; and inputting Chinese Character according to four-corner coding of Chinese character by using the corresponding keys on the keyboard, an inputting rule of Chinese character coding including twenty cutting rules which comprise the characteristic of the excellent code combining with cutting skill. The excellent code table and cutting skill are capable of putting an end to the amphibolous codes, with this input method, most of Chinese characters don't have overlapped codes.

10 Claims, 3 Drawing Sheets excellent code table

| Q | W | E | R | T | Y | U | I | O | P |
|---|---|---|---|---|---|---|---|---|---|
| ノ ヽ 广 丶 匕 戈 辶 | ノ 彳 目 鳥 馬 鳥 | 八 ソ ン 二 ソ ハ 儿 九 ル 匕 石 門 冂 | 三 ニ ー ア 工 ア 王 キ 王 主 大 | 一 山 止 ヰ 广 厂 | 十 艹 ナ ナ メ ナ × オ 金 钅 | ノ ヽ ) 丿 乛 レ ) ヒ 爪 リ | 口 尸 尸 口 コ ヌ | ロ つ 口 口 「 貝 貝 ヒ マ 解 馬 | フ フ レ く ム 也 |

| A | S | D | F | G | H | J | K | L | |
|---|---|---|---|---|---|---|---|---|---|
| ㄴ ㄴ ㄴ ㄴ ㅅ ㄸ ㄴ 攵 衣 | 人 亻 ク 勹 食 旬 | ㅗ 亻 小 ㅆ ㅋ 巛 ㅎ 心 | 一 ソ く ク ラ 方 手 二 音 隹 不 | 广 几 攴 夂 | 牛 牛 丰 丰 虫 中 中 世 虫 | ) フ 才 リ | ロ ロ 尸 尸 尸 ロ リ 目 皿 | 卄 艹 艹 廾 丼 卄 廾 日 日 | |

| Z | X | C | V | B | N | M | | | |
|---|---|---|---|---|---|---|---|---|---|
| 广 码 | 一 攵 冖 ク ㄷ 攵 攴 口 门 | 小 氵 水 ㅛ ㅛ 小 ー ノ | 氵 水 水 田 | 七 匕 匕 土 ㅋ 丱 | 丰 主 申 虫 申 宙 田 日 | 冂 冂 月 中 冂 冂 中 冂 雨 | | | |

| ZZ | | | | | | | | | |
|---|---|---|---|---|---|---|---|---|---|
| ZX | | | | | | | | | |

FIG.2

FOUR-CORNER CUT SQUARE CHINESE CHARACTER INPUT METHOD BASED ON EXCELLENCE CODE

BACKGROUND OF THE INVENTION

1. Field of the Invention

The present invention relates to a Chinese character input method, and more particularly to a four-corner cut square Chinese character input method based on excellent code.

2. Description of the Prior Art

According to the existing different Chinese character input methods, there are always some Chinese characters that have amphibolous codes or too many superposed codes, causing much inconvenience to users. For example, according to the 能散不连 rule of the five-stroke input method, there are three relations (which are called 散, 连 and 交) between the strokes and the roots. Sometimes, however, a Chinese character is divided into several parts and each part includes complex strokes (all roots are not a single stroke), the relation between the parts of the character is amphibolous, it might be both 散 and 连.. For example, the characters, like 占, 卜, 严, can be 散 and can also be 连 at the same time, so those amphibolous codes have to be learned by rote, and this is a hard thing to do. The present application is aimed at solving this problem by making a new Chinese character input method which is capable of putting an end to the amphibolous codes, with this input method, most of Chinese characters don't have overlapped codes, and total number overlapped codes won't be over six.

The present invention has arisen to mitigate and/or obviate the afore-described disadvantages.

SUMMARY OF THE INVENTION

The primary object of the present invention is to provide a four-corner cut square Chinese character input method based on excellent code, which comprises the steps of:

assigning predesigned code table to corresponding keys of a keyboard;

inputting Chinese Character according to four-corner coding of Chinese character by using the corresponding keys on the keyboard, an inputting rule of Chinese character coding including twenty cutting rules which comprise the characteristic of the excellent code combining with cutting skill.

The twenty cutting rules are regulated by first and second ones of the twenty cutting rules and include the following requirements:

taking code in four-corner order: upper left corner, upper right corner, lower left corner and lower right corner, once a code is taken from a corner, the cutting for this corner is completed and will be continued in next corner, after a stroke is taken from a corner, the rest strokes stand still and wait to be cut for the next corner;

using horizontal, vertical cutting lines or head-to-tail cutting lines and an outer frame of the Chinese character to constitute different squares including the shapes of ロ, ⼀, ⼚, 凹 and ⼮-shaped cutting frames;

each cutting square only contains one definite code;

excellent codes are systematic and there are no superposed strokes and crossed strokes between excellent codes, matriculated code can be separated from other strokes and can separate other codes, each cutting square contains one code only, including the cutting squares of shapes of ロ, ⼀, ⼚, 凹 and 凸-shaped cutting frames;

red code is full-cut and fully matriculated when it is cut, taking any three steps in order to cut as many strokes as possible;

two incomplete codes are allowed to share a common stroke, a cutting point exists in a middle section of a common stroke, a cutting line passes through the cutting point to separate the common stroke into two complete strokes, the cutting line is not allowed to cut any strokes that have no cutting point;

inserting or adding radical codes or other radical codes lacking some strokes in order to prevent too much possibility of overlap among the Chinese characters of the same type, for example:

臼, 龜, 鳥, 戈, 大, 犬, 太, 人, 疒, 口, 鬥, 馬, 乌, 乛, 刀, 冂, 乚, 乙, 夂, 食, 爾, 齊, 禾, 厂, 广, 尸, 疒, 工, 王, 几, 寸, 门, 门, 門, 门;

cutting skill can only be implemented by:
understanding of the twenty cutting rules;
grasping excellent code table;

apart from considering original order of the strokes and the squares, black code is cut according to three cutting steps.

BRIEF DESCRIPTION OF THE DRAWINGS

FIG. 2 is an excellent code table in accordance with the present invention, which is applicable both to simplified and traditional Chinese character.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
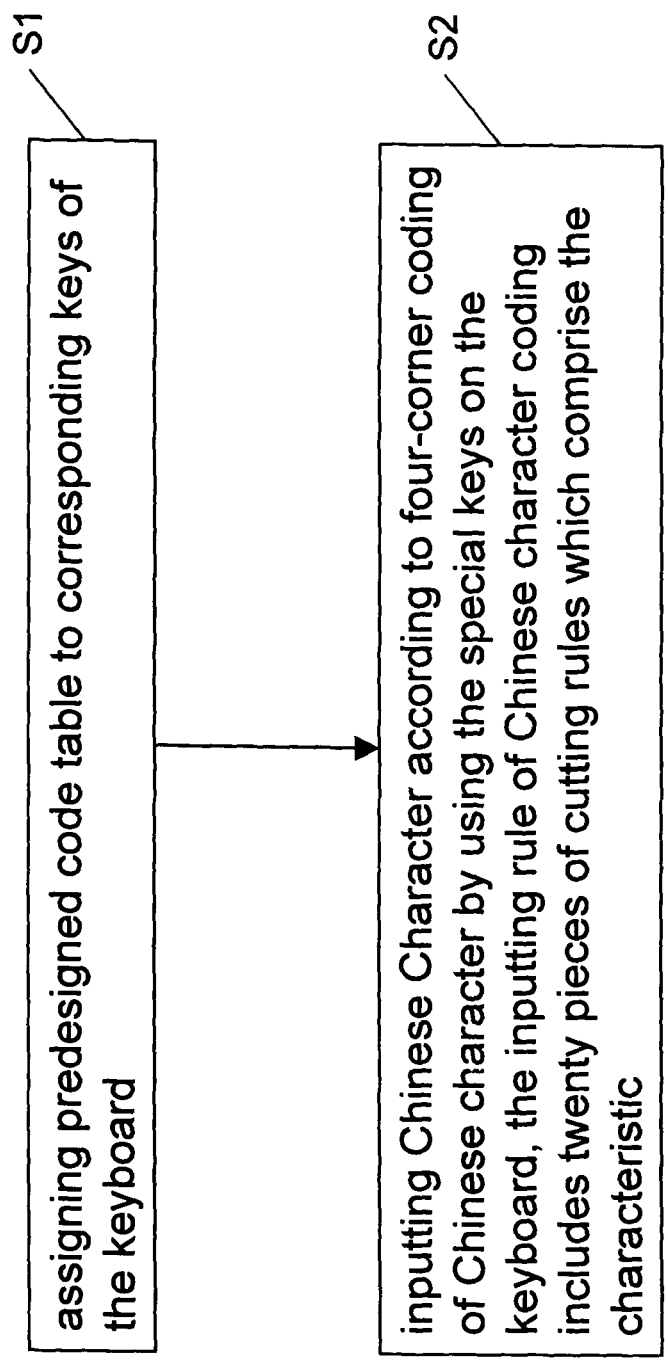
FIG. 1 is a flow chart showing a four-corner cut square Chinese character input method based on excellent code in accordance with the present invention.
Figure 3:
FIG. 3 showing the cutting of some exemplary Chinese characters in accordance with the four-corner cut square Chinese character input method of the present invention.

Referring to FIG. 1, a flow chart shows that a four-corner cut square Chinese character input method based on excellent code in accordance with the present invention comprises the following steps:

S1: assigning predesigned code table to corresponding keys of the keyboard;

S2: inputting Chinese Character according to four-corner coding of Chinese character by using the special keys on the keyboard, the inputting rule of Chinese character coding includes twenty pieces of cutting rules which comprise the characteristic of the excellent code combining with cutting skill.

The twenty pieces of cutting rules are explained as follows:

1, first cutting rule: excellent coding includes four key points, the cutting skill lies in the second one of the four key points, and the four key points of the first cutting rule run through the rest 19 pieces of cutting rules. The four key points are as follows:

First, taking code in four-corner order: upper left corner, upper right corner, lower left corner and lower right corner. Once a code is taken from a corner, the cutting for this corner is completed and will be continued in next corner. After a stroke is taken from a corner, the rest strokes stand still and wait to be cut for the next corner.

Second, the part of the Chinese character from where code is to be taken is a square closest to the cutting corner: horizontal or vertical cutting lines or head-to-tail cutting lines and the outer frame of the Chinese character constitute different cutting squares including the shapes of 口, 二, 厂, 凵 and 凸 -shaped cutting frames. Only the best fit code with the largest number of strokes is taken in the squares.

Third, apart from considering the original order of the strokes and the squares, black code is cut according to three cutting steps: red code is regarded as fourth of the characteristics of an excellent code and should be full-cut and fully matriculated (taken) when it is cut, taking any three steps in order to cut as many strokes as possible.

Fourth, excellent codes are systematic and there are no superposed strokes and other stroke codes between excellent codes. The matriculated code can be separated from other strokes and can separate other codes. Each cutting square contains one code only, including the cutting squares of shapes of 口, 二, 厂, 凵 and 凸 -shaped cutting frames.

The twenty cutting rules are regulated by the four key points of the first cutting rule and the three steps of the second cutting rule. For example, even when new simplified Chinese characters and homophones were issued by the Ministry of Culture of the PRC, the amendment to the present invention should be made without departing from the scope of the four key points of the first cutting rule and the three steps of the second cutting rule.

2, second cutting rule: apart from considering the original order of the strokes and the cutting squares, black codes must be key-coded by three steps. Furthermore, the response of the computer after key-coding of the black codes, and then virtual cutting of a primary cutting skill is carried out.

I am expertly applying the cutting skill of the three steps while considering the original order of the strokes and the cutting squares:

First step: first cutting line is placed between two parallel opposite sides of the outer frame of the Chinese character and can be vertical or horizontal, such as: 元, 图; 如, 围.

If the first step fails or there is more than one code in the square, the second step will be used.

Second step: two cutting lines which are vertical to each other and run across two parallel sides, there are more than one code in the rectangle formed by the first cutting line, the second cutting line is carried out by turning 90 degrees with respect to the first cutting line and runs between two parallel sides: one side is the first cutting line, and the other side is the side of the outer frame of the Chinese character. The code is taken from a small square which is closest to the cutting corner. For example, 带, 帶; 无, 無; 典, 典; 弗, 弗. The two cutting lines of the second step are characterized that: they all run across or are connected between two parallel sides.

If the second step fails, the second step will be used.

Third step: curved cutting: at least two cutting lines which turn continuously 90 degrees with respect to one another and are characterized in that: at least one or more of the cutting lines doesn't run across two parallel sides and constitutes different kinds of shapes of 厂, 凵 or 凸 -shaped frames. All curved cutting lines are red codes, for example, 后, 圖, 同, 圖.

The curved cutting lines of the third step take the best fit code which fits the largest number of strokes, it must be successful.

II, computer's response to cutting skill:

After taking four codes (called four code character) by cutting four corners of the Chinese character, no pressing of the Spacer bar is required. If the four codes input are correct, the corresponding Chinese character will be input in the computer automatically.

four code character requires no pressing of Spacer bar, but the three-code, two-code and one-code characters do. For example, the Spacer should be pressed if all the strokes of the Chinese character have been taken before finishing the cutting of all the four corners, which means that coding of the Chinese character is completed, and the computer will input the Chinese character immediately.

The excellent code of the present invention is followed by 0 which is a temporary substitute mark for the Spacer bar.

For example, 小 is a one-code Chinese character: key code—小 0, or D0;

明 is a two-code Chinese character: key code—日月 0, or NM0;

好 is a three-code Chinese character: key code—姑角木 0, or GPJ0.

III, virtual cutting of the primary cutting skill:

After studying the primary cutting skill, we also learned the cutting order of the four corners and the three cutting steps. Now, we are trying to do the virtual cutting by referring to the following excellent code table:

Here follows are two tables: one table is such that: there are ten Chinese characters in each column, the number before each Chinese character is the sequence number of the Chinese character with respect to the total number of the Chinese Characters. The English codes below each Chinese character correspond to the four corners of the Chinese character.

Another table is: trying to do the virtual cutting by taking a Chinese character as an example.

Numbers 1-20 are examples for horizontal straight cutting:

| 1 膂 | 2 常 | 3 辛 | 4 冬 | 5 蛋 | 6 哭 | 7 容 | 8 寒 | 9 事 | 10 巷 |
|---|---|---|---|---|---|---|---|---|---|
| FIMI | DOMI | FEYC | XF0 | WYBN | EQS0 | QEIS | QLFE | YMUN | LCUI |
| 11 粱 | 12 赛 | 13 辜 | 14 岑 | 15 车 | 16 交 | 17 悉 | 18 茎 | 19 笑 | 20 箅 |
| CCJY | QLOE | BEYC | TSPQ | NY0 | BEX0 | WDDJ | LOBY | XWR0 | XNH0 |

Taking 膏 as an example, four codes are taken according the sequence of the four corners, and the computer automatically input the corresponding Chinese character without pressing the Spacer bar.

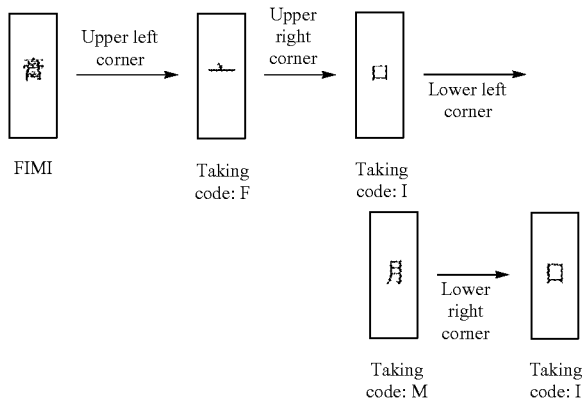

Numbers 21-40 are examples of vertical cutting:

| 21 梆 | 22 化 | 23 叫 | 24 以 | 25 训 | 26 班 | 27 昧 | 28 卅 | 29 淋 | 30 洲 |
|---|---|---|---|---|---|---|---|---|---|
| JKN0 | SB0 | ITU0 | USQ0 | FTWT | RRQW | IJS0 | LY0 | VJJ0 | VTQQ |
| 31 卯 | 32 牧 | 33 沐 | 34 计 | 35 如 | 36 灶 | 37 明 | 38 钊 | 39 冲 | 40 州 |
| PPWT | HX0 | VJ0 | FY0 | GI0 | CB0 | NM0 | YU0 | VM0 | QTWQ |

Vertically cutting three times the Chinese character 梆 to take three codes and pressing the Spacer bar will enable to the computer to automatically input the Chinese character 梆:

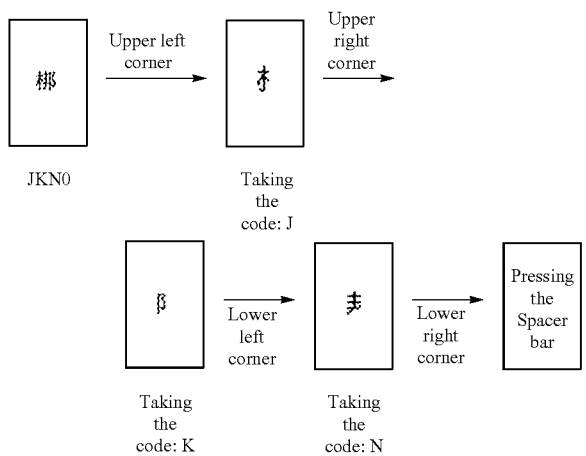

3, the third cutting rule: special red code, ordinary black code, protection code, and protected code.

I. What is a red code?

When the cutting corner encounters a red code, it should be fully-cut and fully taken, and takes any three steps in order to cut as many strokes as possible.

If the code for a certain Chinese character is a red code, then it will always be a red code for other Chinese characters.

II. what is a black code?

All other codes are black codes except the red codes. There are no other special requirements for black code except the twenty cutting rules.

III, what is a protection code?

a—the code which has to protect other codes, must be an integrity code and cannot separate another code by using a straight line;

b—two types of the protection codes are explained as follows:

i. the strokes at both sides of the Chinese character are connected to form two wings: for example: 产, 广, 戈, 乌, 卢, 鸟, 辶, 乚, 鸟, 又:乖, 图 the 丆 code is added because of the Chinese character 乘, which causes the ╪ code maintain to be a black code).

ii. three sides of the Chinese character form an open frame with two legs, for example: 匚, 工, 冂, 凵, 冂, 冂, 冂, 冂.

c—Once a protection code ever protected other codes in a certain Chinese character, this protection code is destined to be a red code forever. For example: 国, 儿; 图, 戈; 国, 七; 图, 人, 土; 图, 工; 图, 王; 翻, 工. 夊 is not a red code, the second code 夊 of the Chinese character 修 is cut according to the cutting rule No. 19.

d—cutting rule No. 13: the strokes 丿 八, 人, 夊 all should be accommodated in the cutting squares ▱, ▱, ▱, the codes compressed in squares were protection codes and will always be red codes, for example: 公, 图; 介, 图; 左, 图, 多.

IV. what is a protected code?

a—what's under the wings or legs of the protection code is a protected code, a Chinese character may have one or more protected code, protected codes are mostly black codes, for example: 鸟, 图; 虚, 图; 马, 图; 后, 图.

b—a few of the protected codes are red codes, and these codes are also protecting other codes whiling being protected. For example: 處, 处, 图, 图; 庭, 廷, 图, 图; 庙, 由, 图, 图.

V. cutting method for red codes:

Target: taking all. Skill: fully cut and fully matriculated (taken). Rule: taking as many red codes as possible by any steps.

Numbers 41-60 are examples for cutting read taking-all excellent codes (also called protection codes).

| 41 疯 | 42 馓 | 43 虎 | 44 骈 | 45 鹅 | 46 窝 | 47 齐 | 48 燕 | 49 局 | 50 兆 |
|---|---|---|---|---|---|---|---|---|---|
| ZCMS | SPUQ | TE0 | OHCP | EWFC | QCVI | FT0 | FUJH | IXI0 | FFE0 |
| 51 眉 | 52 闱 | 53 迅 | 54 斤 | 55 贸 | 56 匐 | 57 誓 | 58 问 | 59 圆 | 60 夷 |
| KTK0 | EOC0 | QPYU | GCT0 | GGOT | XXTY | PPNW | MCI0 | KIO0 | YOSP |

A vertical stroke | is left after taking the first code ⼝ K from the Chinese character 眉, | and ⺝ are all protected codes, so the first cutting step is:

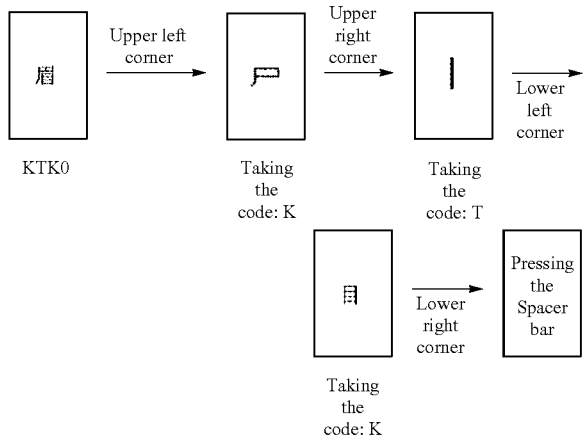

Numbers 61-70, the red codes 土, 七, 工, 王, ⼅ are unseparatable and should be fully cut and fully taken.

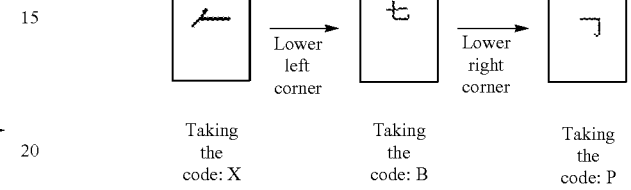

4, the fourth cutting rule (cutting rule No. 4): an inappropriate focus of attention will break the original order of the squares:

I. the focus of attention during cutting is a key process of cutting, which has a direct influence on the accuracy of cutting the squares.

When cutting a corner, the focus of attention is that: it should be the square which is located closest to the corner, in consistent with the cutting rule, and there is only one qualified code with the largest number of strokes.

That is: the focus of attention is on the square.

II. it will cause misjudgement when the focus of attention is put on the strokes.

| 61 诸 | 62 奢 | 63 座 | 64 也 | 65 毡 | 66 他 | 67 施 | 68 巫 | 69 玺 | 70 噩 |
|---|---|---|---|---|---|---|---|---|---|
| FBNY | RBNY | TSBS | BPY0 | WCBI | SPBY | FXBP | RSS0 | XDRQ | RIII |

The third code of the Chinese character 施 includes a straight cutting code ⼂ and a curved cutting code ⺂, it must cut the code ⺂ with more strokes (rule of cutting as many strokes as possible):

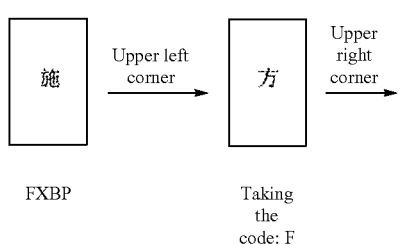

focus of attention when cutting is put on the strokes if straight cutting is preemptively used without considering the original squares-cutting order, the code which is far away from the cutting corner will be mistakenly cut. For example: the second code of the Chinese character 几 will be the ` which is exposed out of 飞, the second code of the Chinese character 贷 will be ⼀ which is exposd out of the ⼐ ⼐, the code of ` in the middle of the lower part of the Chinese characters 氏, 低 will be mistakenly cut without remembering to cut the code ⼃ with more strokes.

Target to be cut: focus of attention is on the square which is closest to the cutting corner, the square only takes the best fit (qualified) code with the largest number of strokes, if the code is a red code, it will take any three steps to cut as many strokes as possible.

III. here follows are five examples of three steps:

a—the stroke ⼃ of the Chinese characters 卯, 卵, 卿, 乡, ⻏, according to the cutting rule No. 15: the tail of the stroke ノ should be pulled straight a little, which causes the square of the ノ moves out of the cutting scope of the lower left corner, and as a result, the third code taken by the lower left corner cutting will be the stroke ㇀, ∠, or ㇀, which is square located closest to the lower left corner.

b—normal cutting rule: the lower left and right corner cuttings to the last stroke ㇆ are vertical cuttings which are made to take the third code ⌐ and the fourth code ㇆. This cutting is consistent with the correct cutting rule.

If the tail of the stroke ㇆ is bent to the lower left corner to become ㇆, plus it is a red code, then curved cutting is used to take the third code ⌐, and the fourth code ∠; this is another inaccurate result.

Two different results appear due to the different ways of writing, and such amphibolous results are not allowed.

Therefore, the cutting rule No. 12 is added to solve the above problem, the remanent stroke ㇆ is cut into two parts ⌐ and ㇆ which are arranged in an up-and-down manner and a horizontal interval appears between the ⌐ and ㇆, so that the remanent stroke of the third code becomes: ⌐, the red code ㇆ should use the curved cutting in the first place and now changes to use horizontal cutting, and as a result, the third code is still ⌐, and the fourth code is ㇆, putting an end to the two amphibolous results.

The different Chinese characters 勺, 号 have the same remanent stroke ㇆ by using different corner cuttings, namely, vertical cutting or horizontal cutting.

c—after the first cutting to the Chinese characters 贵, 贵 is made by curved cutting to take the first red code 士, please note that the second code can absolutely not be made by vertically cutting the exposed right arm, namely the stroke ㇀, from the right side of the 贵, 贵, such cutting method will completely break the original order of the squares.

d—if the second code of the upper right corner of the Chinese character 幾 is taken by vertically cutting the stroke ㇀ exposed out of 戈, it will break the original order of the squares, let alone that the 戈 is a red code which is not allowed to be far away from the cutting corner.

The right cutting is such that: the second code of the upper right corner of the Chinese character 幾 should be made by curved cutting to take the stroke ∠.

e—the third code ㇀ of the two Chinese characters 氏, 低 is a two-stroke code, and their fourth code ㇏ is a red code which has the priority to be cut; the code ㇀ is inferior to ㇏, for example: 氏—— left downward stroke 撇, hook, hook; 低——人, left downward stroke 撇, hook, hook.

f—the cutting to the remanent strokes 幺, 丝 of the second code of the Chinese characters 玄, 幽 should be made by moving the ∠ out of the horizontal line of the 幺 instead of vertically cutting the ㇀ which is located at the right side and far away from the cutting corner. For example, 幽, cutting the ∠ according to three steps—the cutting rule No. 18.

5. Cutting rule No. 5, the common strokes and cutting points of two codes

I. common strokes and cutting point shared by two codes:

Two incomplete codes share a common code, including straight stroke, inclined stroke, and curved stroke. The stroke connecting the two incomplete codes together is called a common stroke.

II. the cutting point only exists in the middle section of a common stroke.

The cutting line passes through the cutting point to separate the common stroke into two complete strokes, the cutting point can freely move within the middle section of the common stroke, namely: the two stokes after cutting can be lengthened or shortened.

The non-common stroke has no cutting point, and the cutting line doesn't cut any strokes that have no cutting point.

Only the cutting point used in a certain Chinese character is considered as a cutting point, for example:

One cutting point: 乙, 力, 尢, 本, 电, 里, 内, 丙
Two cutting points: 马, 串, 曲, 甲, 录, 鸟, 鱼, 两
Three cutting points: 亜, 巫
Four cutting points: 曲, 典, 禹, 燕
Five cutting points: 册, 凶, 凸。

III. what's the difference and similarity between the methods of counting the strokes of a Chinese character and an excellent code?

i. single strokes are all same:
the single strokes of a Chinese character and an excellent code are all counted as one stroke: for example: ㇏, ノ, ㇀, 一, 丨.

ii. continuous strokes (soft bristles) are different:

a—all the continuous strokes of a Chinese characters: including rightward stroke, rightward stroke with downward end, leftward stroke with downward end, upward hook, are all counted as one stroke, for example: 亅, ㇀, ㇇, ㇏, ㇄, ㇗, ㇆, ∠, ㇈, ㇉.

Continuous strokes are widely applied in literacy, dictionary searching, and calligraphy.

b—continuous strokes of an excellent code: every 90-degree turn is counted as one stroke, for example:
two strokes: 亅, ㇀, ㇇, ㇏;
three strokes: ㇄, ㇗, ㇆;
four strokes: ∠, ㇈, ㇉ this rule of every 90-degree turn being counted as one stroke is also applied to the curved continuous strokes of an excellent code and is merely designed to choose the code which has the largest number of strokes to cut.

6, cutting rule No. 6: the downward extension from the vertical stroke in the middle of the 田, 口, two different requirements on setting rules:

Requirement No 1: there are other strokes below the vertical stroke in the middle of the 田, 口, and the other strokes from code. The 田, 口 and the code thereunder have no cutting point, and the 田, 口 is separated from the code thereunder. For example: 里, 田——水坭; 果, 田——水木; 畢, 田——水草牛插; 男, 田——水月人; 兔, 田——撇角排围. There is no stroke below the 口 to form a code with the vertical stroke thereof.

Requirement No.2: there is no stroke at the right side of the lower stroke of the 甲, 甲, plus tail of a stroke is not allowed to be cut and used as a stroke, so cutting rule No. 19 has to be used to cut at the cutting point of 干, 干 disengages from the upper square to become a code, for example: 申, 申; ヌ——撇马插牛.

7, cutting rule No. 7: cutting the space left by taking away the separating stroke, the separating stroke has two functions as follows:

I. taking away the separating stroke leaves behind a space, the function of separating the strokes at both sides and forming new code still retains, for example: 龍, 鼉, 圐, 朋, 串;

II. the existence of separating stroke can stop the passage of cutting line:

If a separating stroke exists, its function of stopping the cutting line also exists, for example: 噩, 坐; 圄, 巫, 噩, 乖.

On the other hand, if the separating strokes is taken away, the function of stopping the cutting line also does not exist, for example: 巫, 凶, 乖, 曰.

8, cutting rule No. 8: cutting the code with the largest number of strokes under the condition of same color and same step, for example: 兼——排煤煤日; 殷——围排角插; 斋——圯人囚丨丨; 舞——竹圯竹牛.

Numbers 71-80, cutting the code with the largest number of strokes under the condition of same color and same step;

The second code of the Chinese character 肃 has the options of straight cutting + and curved cutting ≠, it must choose the straight cutting +.

| 71 昔 | 72 斋 | 73 扭 | 74 丧 | 75 玉 | 76 者 | 77 煮 | 78 老 | 79 殷 | 80 考 |
|---|---|---|---|---|---|---|---|---|---|
| BYNB | BSKI | UPB0 | BIUA | RQ0 | BYN0 | BYCN | BYB0 | KEPY | BYPP |

The first code 土 of the Chinese character 者 must be fully cut and fully taken because it is red:

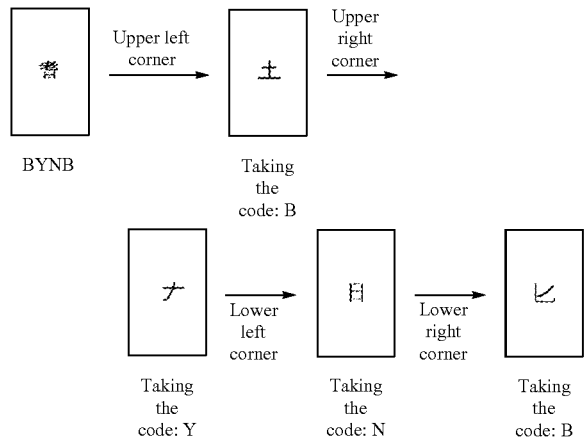

BYNB

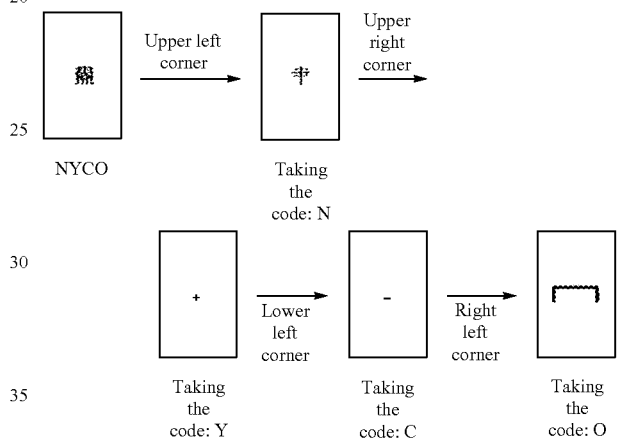

NYCO 9, cutting rule No. 9: for black codes under the condition of the same step and same number of strokes, straight cutting is prior to curved cutting, for example: 盍——口插煤马; 卵——撇囗钩捺; 母——马捺钩丨; 也——圯角插0.

Numbers 81-90, the code in the cutting corner is red, it should cut the code with the largest number of strokes, and the code must be fully cut:

10. cutting rule No 10, under the condition of the same step and same number of strokes, horizontal cutting is prior to vertical cutting, for example: 凸——丐丐丐角; 必——捺捺捺圯; 井——草捺草; 井——草草; 毋——马草 角卓.

Note: 低——人撇钩钩; 氏——撇插钩钩, since the third code 丿 has two strokes, the fourth stroke ㇏ is red code, horizontal cutting ㇀ is inferior.

11, cutting rule No. 11, where there are two cuttings in total in a Chinese character to be cut, the first cutting should cut the part of the Chinese character with the largest number of strokes, and so should the second cutting.

| 81 鼠 | 82 卵 | 83 报 | 84 電 | 85 带 | 86 典 | 87 羽 | 88 臣 | 89 病 | 90 或 |
|---|---|---|---|---|---|---|---|---|---|
| NYCO | WKUQ | UIYO | OOOU | YBMO | PPEC | PPFF | OTTO | ZCMS | QIC0 |

The second code with the largest number of strokes of the Chinese character 無 is 煞(竹上煤上), the second cutting with the largest number of stroke is the 泥 code 土码; The second code with the largest number of strokes of the Chinese character 舞(竹十竹牛) is 舞, the second cutting with the largest number of stroke is the 泥 code 土; The second code with the largest number of strokes of the Chinese character 亞(煤乃煤角) is 亞, the second cutting with the largest number of stroke is the 马 code 三; The second code with the largest number of strokes of the Chinese character 鹿 (立马钩坭) is 鹿, the second cutting with the largest number of stroke is the 马 code 三; The second code with the largest number of strokes of the Chinese character 慶 (立马水马) is 慶, the second cutting with the largest number of stroke is the 马 code 三; The second code with the largest number of strokes of the Chinese character 帶 (抺坭月乃) is 帶, which is the red code 七.

Numbers 101-110 are examples with two cuttings:

| 101 無 | 102 舞 | 103 亞 | 104 帶 | 105 慶 | 106 鹿 | 107 典 | 108 孫 | 109 | 110 貨 |
|---|---|---|---|---|---|---|---|---|---|
| XBCB | XBXH | COCP | YBMO | TOXD | TOUB | PPEC | PDJ0 | PPVP | SBO0 |

There are two cutting in the second code of the Chinese character 無, the first cutting is the 竹 which has the largest number of strokes, and the second cutting is the code 土.

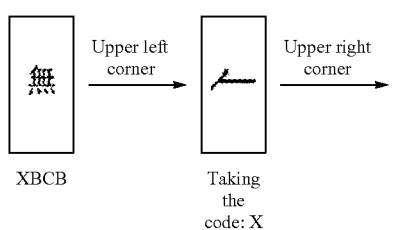

The Chinese character 典 are cut with two cuttings, the first code of first cutting chooses the 卄 which has the largest number of strokes, and the second cutting is vertical cutting to cut the code 厂, for example: 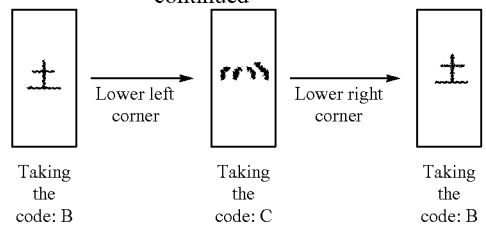

The first code of first cutting of the Chinese character 典 chooses the 卄 which has the largest number of strokes, and the second cutting is vertical cutting to cut the code 厂:

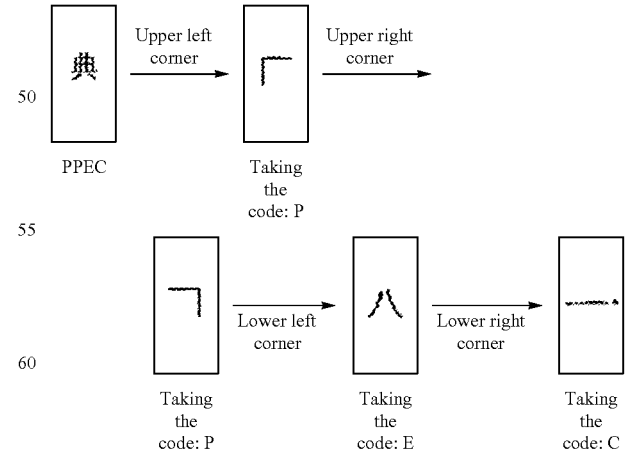

numbers 111-150 are examples of taking radical codes (including the Chinese characters lacking some strokes):

| 111 传 | 112 写 | 113 减 | 114 厌 | 115 谣 | 116 姨 | 117 动 | 118 执 | 119 随 | 120 纽 |
|---|---|---|---|---|---|---|---|---|---|
| SHQP | OCCP | VQGI | GQS0 | FWTY | GYSP | RPPY | UPYU | KYQM | PPB0 |
| 121 港 | 122 壮 | 123 帜 | 124 形 | 125 骚 | 126 衔 | 127 垦 | 128 极 | 129 督 | 130 赐 |
| VLUI | FBT0 | MIE0 | CFLW | OOCH | WRYU | KCBA | JPWY | TOKY | ONEX |
| 131 熨 | 132 庵 | 133 旗 | 134 殴 | 135 礼 | 136 浆 | 137 飓 | 138 医 | 139 铁 | 140 盛 |
| IJCQ | MRUN | FXEC | OEYY | RUD0 | FXVQ | GOYE | OXR0 | YYRD | GQCO |
| 141 疑 | 142 释 | 143 辨 | 144 触 | 145 露 | 146 静 | 147 难 | 148 隶 | 149 魏 | 150 麟 |
| BPRS | WOJH | FFQY | XHMH | MXWI | HXMU | OFYB | NV0 | WWGE | TDUH |

Setting special cutting rules for special strokes-there are totally seven cutting rules:

12. cutting rule No. 12: the remanent stroke ㄅ of the Chinese characters 号, 考 is cut by horizontal cutting instead of vertical cutting into two parts and ㄴ and ㄱ which are arranged in an up-and-down manner and a horizontal interval appears ㄴ and ㄱ so that the remanent stroke of the third code becomes: 彐, so as to put an end to the two amphibolous results for the following reasons:

First, vertically cutting the remanent stroke of the second code ㄛ of the Chinese character 亏, the second code takes the red code ㄧ and the third code takes the red code ㄴ this is the first result, which totally conforms with the twenty cutting rules.

vertically cutting the remanent stroke of the third code ㄛ of the Chinese character 号, the third code takes the red code ㄴ and the fourth code takes the red coe ㄱ, this is the second result, which contradicts the following cutting methods:

if bending the tail of the third code ㄛ of the Chinese character 号 toward the lower left corner, the third code will take the red code ㄱ, and the fourth code will be ㄥ by curved cutting, which contradicts the above cutting method.

Two different results appear due to the different ways of writing, and such amphibolous results are not allowed.

Second, replacing the original curved cutting with horizontal cutting 彐, the third code takes the red code ㄧ and the fourth code takes the red code ㄴ by putting this into the twenty rule, thus putting an end to the two amphibolous results.

The cutting rule No. 12 puts an end to the two amphibolous results: the two cutting methods for the remanent stroke ㄅ of different Chinese characters and different cutting corners are all applicable. For example: 亏——叠角角; 号——口 煤角角; 丐——煤角角立; 考——坭插角角; 巧——叠煤角角.

13, cutting rule No. 13, for all the codes, such as 八, 人, 久, associated with the strokes ノ and ヽ, the tails should be pressed a little upward into the flat and horizontally arranged cutting square, making the cutting square leave the below code, the red codes 八, 人, 久 are pressed to become ⊡, ⊡, ⊡ and are still red codes, for example: 基——卓叠坭排; 春——日人日; 介——人立撇; 处——竹捺立; 冬——竹言.

Note: the stroke 亻 is different from 亻, the former includes two strokes: left downward stroke 撇, and a vertical stroke, the latter is one code of 人. For example: 段——撇排插插;

印——撤||钩煤; 卯——撤||钩撤; 卵——撤月 钩捺;
兵——撤煤排煤; 段——撤排插插; 低——人撤钩钩;
氏——撤插钩 钩.

14, cutting rule No. 14, the strokes passing through the horizontal stroke, pressing the downward strokes to the left and the right that passes through the horizontal stroke into the cutting square ⊡, ⊡, so as to make a room for the cutting squares thereabove or thereunder, once entering the cutting angle, the red codes 六, 大 have the priority to be cut, for example: 考——坭插角角; 都——坭冂日插; 老——坭插坭.

The first code of the Chinese character 都 can be 十 which is taken by vertical cutting or the 土 which is made by curved cutting, however, the code 土 is a red code, therefore, the code 土 has the priority.

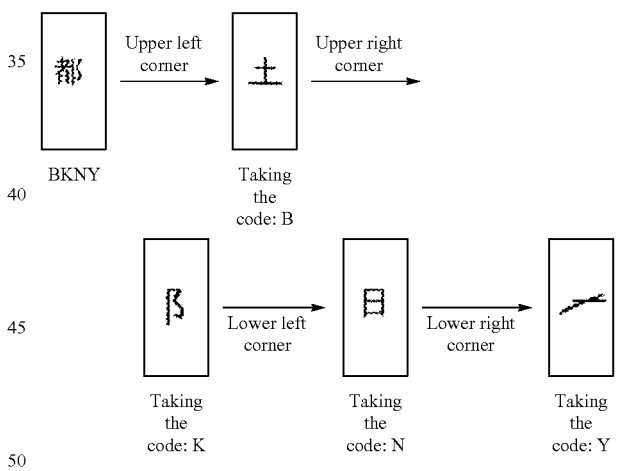

15, cutting rule No. 15: cutting method of slightly pressing the 丿 (柳) rightward into the three types of squares:

stroke 丿 (柳) must satisfy one of the following three conditions:

I. the stroke 丿 (柳) is hung from the left end of a horizontal stroke, and only when the stroke 丿 (柳) extends downward to the bottom of the Chinese character, cutting can be made in the lower left corner to cut with the cutting square ⊓, such as 后, 厅, 所, 房, 局.

II. the stroke 丿 (柳) is hung from the right end of a horizontal stroke, and only when the stroke 丿 (柳) extends downward to the bottom of the Chinese character, cutting can be made in the lower right corner to cut with the cutting square ⊓, such as 卯, 卵, 脚, 卿, 乡.

III. strokes 丿 (柳) is hung from the right end of a horizontal stroke or passes through the horizontal stroke, while the right end of the horizontal stroke has the strokes 丨, 亅, 丶, ㇄, for example: 介, 鼻, 刀, 为, 儿, 无, 尴, 尬, 带, the 丿 which is parallel to the 丨, 亅, 丶, ㇄ satisfies the third condition.

How to define a downward stroke 撇 and a stroke 丿 (柳):

A downward stroke 撇: only a stroke which has na 捺 passing down through a horizontal stroke to left 撇 is defined as 撇.

丿 (柳): the stroke is 丿 (柳) only when it meets the conditions that it passes through a horizontal stroke and there is a corresponding vertical stroke or hook at the right end of the horizontal stroke (卅, 廾, 卌, 为, 无).

The cutting squares for identifying the 撇 and 丿 (柳):

The cutting squares for 撇: ⌐; ⌐⌐, ⌐⌐, ⌐⌐.

The cutting squares for 丿 (柳): ⌐, ⌐; ⌐, ⌐.

For a Chinese character with a first red code, the first cutting should cut the part of the Chinese character with the largest number of strokes, and so should the second cutting.

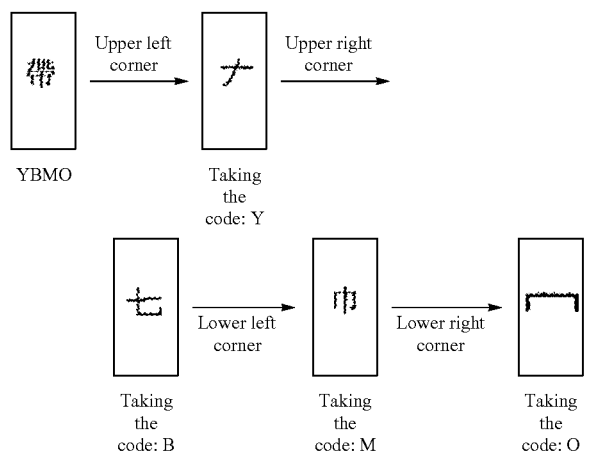

YBMO 16, cutting rule No. 16, it should be considered as separate and no cutting point when a tail of a stroke contacts the middle section of another stroke:

For example 黽 has four codes in the four corners contacting the middle section of other strokes:

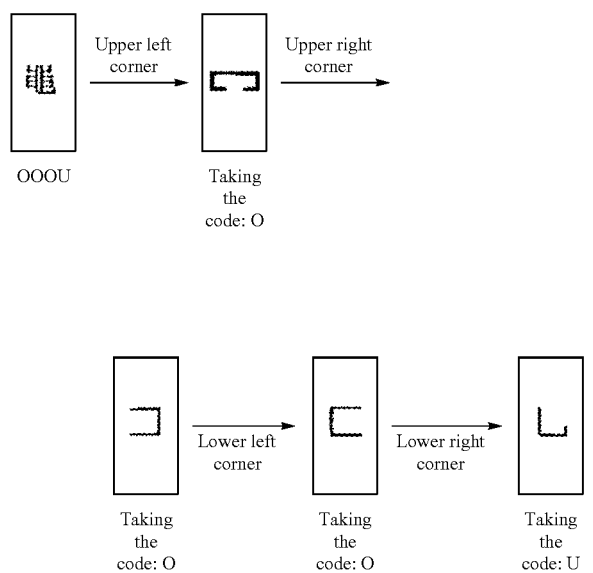

OOOU 17, cutting rule No. 17, it should be considered as separate when the angle between the tails of two strokes is larger than 90 degrees, except for the ready-made codes:

Examples of ready-made codes: 后, 斤, 质, 贤, 所, 殴, 鹰

Examples of non-ready-made codes: 段, 印, 卯, 卿, 卵, 孵, 兵, 氐, 祇

The first and second codes of the Chinese character 所 have a larger-than-90 degree angle therebetween, it should be considered as separate, the ready-made codes 卩, 厂, however, are not the case.

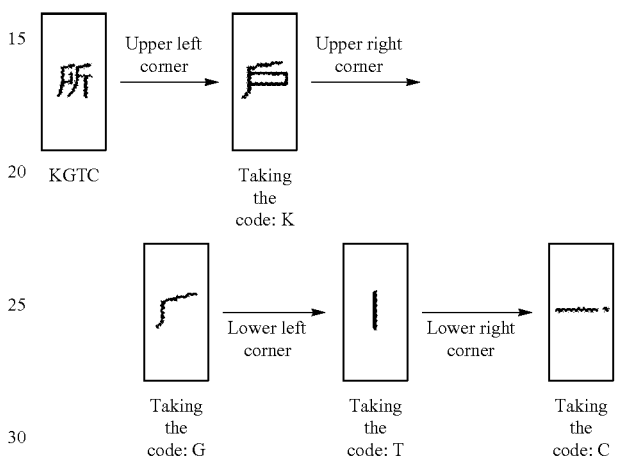

KGTC 18, cutting rule No. 18, if less than half of a stroke is covered by another stroke, the covered part of the stroke can be moved out of the horizontal cutting line and cut by straight cutting or two cuttings. For example: 鼎——围角撇角; 奥——土土叠角; 县——围撇小角; 丏——煤角角立; 玄——言角角捺。

The target code of the Chinese character 鼎 is less than half covered, and its covered portion is moved out of the horizontal cutting line and cut by straight cutting.

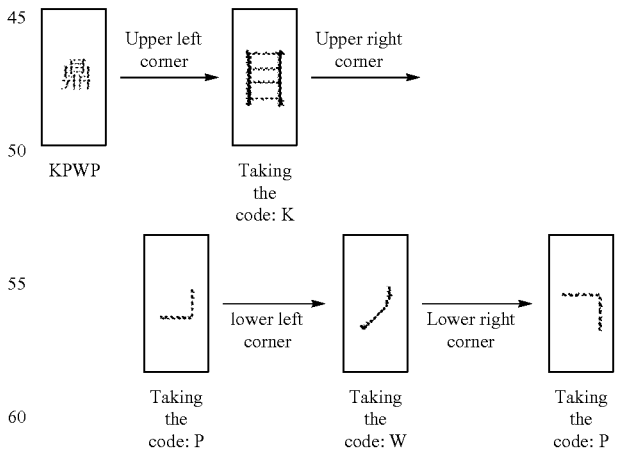

KPWP

The second code of the Chinese character 玄 is less than half covered, and its covered portion is moved out of the horizontal cutting line and cut by straight cutting to take the code ∠:

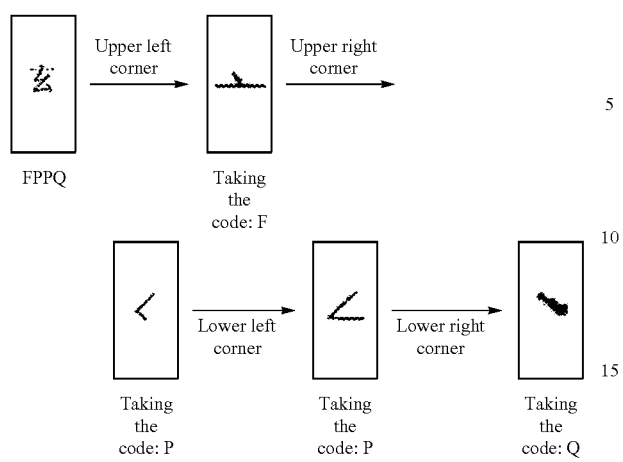

The code 马 has two different cutting rules: a special one and a normal one.

19, cutting rule No. 19, moving the single code within a code 马 cutting square which opens upward or downward out of the horizontal cutting line, the single code has the priority to be cut by straight cutting, for example: 凶, 图; 由, 国, 曲, 冒; 甲, 冑; 卑, 皇. If there is a horizontal stroke covering the open end of the code 马, such as 且, 旦, 皿, this cutting rule is not applicable. The special cutting rule is designed to solves the problem caused by whether the first code is within or outside the square of code 马..

the first single code means that other strokes are not allowed to exist at both sides of the first code within the square but allowed to exist behind the first code, for example: 傻——人捺竹排.

If the first single code in the square of the code 马 has a cutting point, it should disengage from the cutting point and move out of the square to realize vertical cutting.

The single code 𠂇 within the second code 冂 disengages from the cutting point and horizontally moves out of the square to cut 毕:

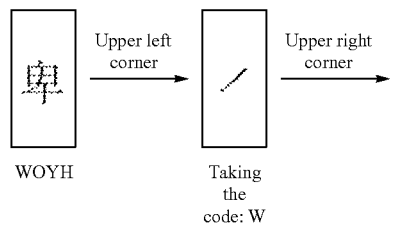

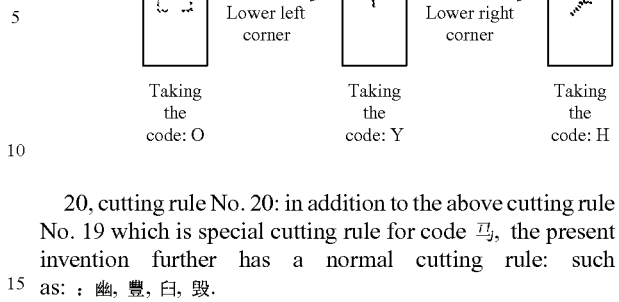

20, cutting rule No. 20: in addition to the above cutting rule No. 19 which is special cutting rule for code 马, the present invention further has a normal cutting rule: such as: , 幽, 豐, 臼, 毀.

The first code of the Chinese character 幽 takes the red code 凵, the second and third codes horizontally move to change the curved cutting into two cuttings 幺幺:

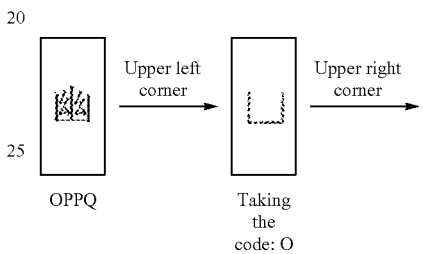

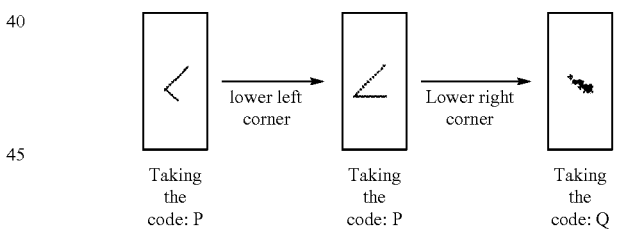

Numbers 141-180, Chinese characters include traditional and simplified Chinese characters, and the same Chinese characters can be much differently written.

| 141 瓦 | 142 敎 | 143 甚 | 144 叔 | 145 凹 | 146 凸 | 147 弗 | 148 丏 | 149 带 | 150 卯 |
|---|---|---|---|---|---|---|---|---|---|
| CPPU | HXXC | LRPE | TODY | OOOP | OOOP | OOOO | CPPT | WKUQ | LYMO |
| 151 臽 | 152 兔 | 153 奧 | 154 芽 | 155 茬 | 156 躬 | 157 函 | 158 電 | 159 片 | 160 罪 |
| WDOC | XKET | WOSC | LCWJ | LYSB | WOWP | PVO0 | INU0 | WTPC | CCR0 |
| 161 制 | 162 兔 | 163 氮 | 164 哥 | 165 县 | 166 奭 | 167 奔 | 168 飞 | 169 窗 | 170 逆 |
| LUOP | XKEQ | XUSW | CTIU | ORPQ | BBRP | ROH0 | PFU0 | QEMM | QEWP |

-continued

| 171 伪 | 172 舟 | 173 夗 | 174 忝 | 175 纳 | 176 迅 | 177 鼎 | 178 孵 | 179 鳌 | 180 赟 |
|---|---|---|---|---|---|---|---|---|---|
| SPYQ | WOLQ | XIQU | CRDQ | PPYU | QPYU | KPWP | WWUJ | HXCV | BIOP |

The code ▢ of the Chinese character 毁 is open upward, and there are two code arranged in parallel in the square, so normal cutting gives the priority to the red code:

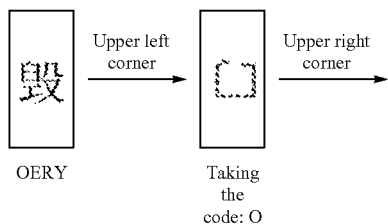

OERY → Upper left corner → Taking the code: O → Upper right corner →

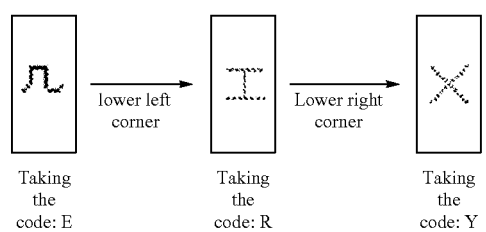

lower left corner → Taking the code: E → Lower right corner → Taking the code: R → Taking the code: Y The twenty cutting rules have been explained as above, and then we continue to discuss the excellent code table:

A, the detail contents of excellent table:

I. three small rectangles of the squares;

The excellent code tables includes 26 squares containing Chinese characters, each square is divided into three small rectangles, and the contents of the three small rectangles are as follows:

i. the first rectangle: name code.

Name code is the general name of all excellent codes in the squares, 26 squares have 26 general names.

Name code doesn't have the cutting function, and only when it appears in the third small rectangle, the name code has the cutting function.

The name codes of the first small rectangles are as follows, the left side of the small rectangle is English name, and the right side is the Chinese name.

| Q 捺 | W 撇 | E 排 | R 登 | T 立 | Y 插 | U 钩 | I 口 | O 马 | P 角 |
|---|---|---|---|---|---|---|---|---|---|
| A 建 | S 入 | D 小 | F 音 | G 姑 | H 牛 | J 木 | K 国 | L 草 | |
| Z 症 | X 竹 | C 煤 | V 水 | B 妮 | N 日 | M 月 | | | | ii. the second rectangle: four characters description.

Describing in four Chinese characters the characteristic of the excellent codes in the squares as well as the correlation between the codes, for example:

a—E 排, 两笔并排:
the codes this square are formed by two parallel strokes;

b—D 小, 三笔并排 means that three strokes are in parallel
the codes this square are formed by three parallel strokes;

c—C 煤, 四笔并排 means that four strokes are in parallel:
the codes this square are formed by four parallel strokes;

iii. the third rectangle: head codes, subcodes and radical codes (including Chinese characters or codes lacking strokes).

All the codes in the third rectangle are exclusively used for cutting.

a—head codes, like a manager of a company, stay in the front of the third rectangle and are representative codes indicating the systematic sequence of the 26 squares.

b—subcodes, like members in a company, are the same type of the head codes and derived from the head codes by slightly changing the stroke structure of the head codes.

c—radical codes, like members with special duty in a company, are radicals of Chinese characters, including Chinese characters or codes lacking strokes, most of them are red codes.

II. in the first one of the three lines are 10 systematically arranged head codes:

i. the 10 head codes in the first line of the following table are systematically arranged, and arranged in the second line of the table are popular names of the systematic change:

| ╲ | ╱ | 八 | ＝ | ｜ | ＋ | 丁 | 口 | ⊏ | ∟ |
|---|---|---|---|---|---|---|---|---|---|
| Right downward stroke | Left downward stroke | parallel | superposed | Vertical | Passing through | hook | Four sides | Three sides | Two sides | ii. the following a-J are: the close correlation of the head codes of the first line with respect to the head codes in the second and third lines of the same column as the corresponding head codes of the first line.

a—the first column:
the first line: a right downward stroke, coder 捺 Q (╲);
the second line: adding strokes to the upper right of the 捺, encoding A (╲);
the third line: code 症 Z (疒); ZZ substitutes for the forgotten code database, ZX is personal long sentence database.

b—the second column:
the first line: a left downward stroke, code 撇 W (╱);
the second line: to the middle section of the left downward stroke is connected a right downward stroke or vertical stroke; code 入 S (入)
the third line: adding a horizontal stroke or more strokes to the middle section of the left downward stroke; code 竹 X (ㄏ).

c—the third column:

the first line: two parallel strokes; code 排 E (八);

the second line: three parallel strokes; code 小 D (⺍);

the third line: four parallel strokes; code 煤 C (灬);

d—the fourth column:

the first line: two superposed horizontal strokes: code 叠 R (二);

the second line: two dots or strokes, or a dot and a horizontal stroke are superposed, namely code 码 F (亠);

the third line: three superposed strokes or a code looks like the Chinese character 水; code 水 V (氵).

e—the fifth column:

the first line: vertical stroke: code 码 T (丨);

the second line: strokes on the top of the code 丿(柳); code 姑 G (厂);

the third line: like a fishing hook; code 坭 B (七).

f—the sixth column:

the first line: a hookless vertical stroke with a horizontal stroke passing therethrough; code 插 Y (十);

the second line: a hookless vertical stroke with two horizontal strokes passing therethrough; code 牛 H (丰);

the third line: a hookless vertical stroke with three horizontal strokes passing therethrough; code 冉 N (丰).

g—the seventh column:

the first line: a vertical stroke with a hooked end; code 钩 U (亅);

the second line: a vertical stroke with a hooked end having a horizontal stroke passing therethrough; code 木 J (亅);

the third line: a vertical stroke with a hooked end having a horizontal stroke at the upper left side thereof connected another left foot: code 月 M (冂).

h—the eight column:

the first line: four sides define a 口 which contains no code therein; code 口 I (口);

the second line: four sides define a 口 which contains codes therein, taking away the 冂 and leaving the codes behind; code 出 K (凵);

the third line: no codes;

i—the ninth column;

the first line: two angles are connected to form a code 马; code 马 O (二);

the second line: two 十 are connected to form a code 苜; code 苜 L (艹);

the third line: no codes:

j—the 10th column:

the first line: two sides are connected to form a code 角: code 角 P (⌐).

the second line: no codes:

the third line: no codes;

A—to gain a better understanding of the present application by observing the vertical and transverse relations of the first line head codes:

| Right downward stroke | Left Downward Stroke Or the 丿 | Two parallel strokes | Two superposed strokes | Vertical stroke | Two crossed strokes 十 | Vertical Or bent hook 亅 | four sides define a 口 which contains no code therein | Three sides define double angle | Two Sides define an angle |
|---|---|---|---|---|---|---|---|---|---|
| Adding strokes to the upper right of the 捺 | to the middle section of the left downward stroke is connected a right downward stroke or vertical stroke; code 人 S (八) | Three parallel strokes | Dot or horizontal stroke superposed | Horizontal or left downward stroke on the top of the code 丿(柳) to form 厂 厂 | a hookless vertical stroke with two horizontal strokes passing therethrough 牛 丰 | a vertical stroke with a hooked end having another stroke passing therethrough or hanging therefrom; 寸 豸 | four sides define a 口 which contains codes therein, taking away the 冂 and leaving the codes behind; | two 丨 are connected to form a code 卓 艹艹 | |
| Z 丿 ZZ substitutes for the forgotten code database, ZX is personal long sentence database | adding a horizontal stroke or more strokes to the middle section of the left downward stroke; 厂 父 | Four Parallel strokes | three superposed strokes or a code looks like the Chinese character 水 氵 | a fishing hook with a horizontal stroke or a left downward stroke 七 匕 | a hookless vertical stroke with three horizontal strokes passing therethrough 冉 车 | a vertical stroke with a hooked end having a horizontal stroke at the upper left side thereof connected another left foot 冂 冂 | | | |

While we have shown and described various embodiments in accordance with the present invention, it is clear to those skilled in the art that further embodiments may be made without departing from the scope of the present invention.

What is claimed is:

1. A four-corner cut square Chinese character input method based on excellent code, comprising the steps of:

assigning predesigned code table to corresponding keys of a keyboard;

inputting Chinese Character according to four-corner coding of Chinese character by using the corresponding keys on the keyboard, an inputting rule of Chinese character coding including twenty cutting rules which comprise the characteristic of the excellent code combining with cutting skill, wherein the twenty cutting rules are regulated by first and second ones of the twenty cutting rules and include the following requirements:

taking code in four-corner order: upper left corner, upper right corner, lower left corner and lower right corner, once a code is taken from a corner, the cutting for this corner is completed and will be continued in next corner, after a stroke is taken from a corner, the rest strokes stand still and wait to be cut for the next corner;

using horizontal, vertical cutting lines or head-to-tail cutting lines and an outer frame of the Chinese character to constitute different squares including shapes of  and -shaped cutting frames;

each cutting square only contains one definite code;

excellent codes are systematic and there are no superposed strokes and crossed strokes between excellent codes, matriculated code can be separated from other strokes and can separate other codes, each cutting square contains one code only, including the cutting squares of shapes of  and -shaped cutting frames;

red code is full-cut and fully matriculated when it is cut;

two incomplete codes are allowed to share a common stroke, a cutting point exists in a middle section of a common stroke, a cutting line passes through the cutting point to separate the common stroke into two complete strokes, the cutting line is not allowed to cut strokes that have no cutting point;

inserting or adding radical codes, or other radical codes lacking some strokes, in order to prevent overlap among the Chinese characters of same type, including:

cutting skill is implemented by:

understanding of the twenty cutting rules;

grasping excellent code table;

apart from considering original order of the strokes and the squares, black code is cut according to the following three cutting steps:

first step: first cutting line is placed between two parallel opposite sides of the outer frame of the Chinese character and can be vertical or horizontal, including: ;

if the first step fails or there is more than one code in the cutting square, the second step will be used;

second step: first and second cutting lines which are vertical to each other and run across two parallel sides, there are more than one code in a rectangle formed by the first cutting line, the second cutting line is carried out by turning 90 degrees with respect to the first cutting line and runs between two parallel sides: one side is the first cutting line, and the other side is the side of the outer frame of the Chinese character, the code is taken from a small square which is closest to the cutting corner, including, , the two cutting lines of the second step are characterized that: they all run across or are connected between two parallel sides;

if the second step fails, the third step will be used;

third step: curved cutting: at least two cutting lines which turn continuously 90 degrees with respect to one another and are characterized in that: at least one or more of the cutting lines doesn't run across two parallel sides and constitutes different kinds of shapes of  or -shaped cutting frames, all curved cutting lines are red codes, including, .

2. The four-corner cut square Chinese character input method based on excellent code as claimed in claim 1, wherein the excellent code includes red code, black code, protection code and protected code, a third one of the twenty cutting rules is explained as follows:

when a cutting corner encounters a red code, it should be fully-cut and fully taken;

if the code for a certain Chinese character is a red code, then it will always be a red code for other Chinese characters;

all other codes are black codes except the red codes;

there are no other special requirements for black code except the twenty cutting rules;

a protection code has to protect other codes and must be an integrity code and cannot separate another code by using a straight line;

two types of the protection codes are explained as follows:

i. the strokes at both sides of the Chinese character are connected to form two wings: including:  (the  code is added because of the Chinese character 乘, which causes the 十 code maintain to be a black code);

ii. three sides of the Chinese character form an open frame with two legs, including: ;

once a protection code ever protected other codes in a certain Chinese character, this protection code is destined to be a red code forever; including: ;

cutting rule No. 13: the strokes 丿八 一, 人, 夂 all should be accommodated in cutting squares , the codes compressed in squares were protection codes and will always be red codes, including: ;

what's under the wings or legs of the protection code is a protected code, a Chinese character may have one or more protected code, protected codes are mostly black codes, including: ;

a few of protected codes are red codes, and these codes are also protecting other codes whiling being protected, including:  ;

cutting method for red codes:

target: taking all, skill: fully cut and fully matriculated (taken).

3. The four-corner cut square Chinese character input method based on excellent code as claimed in claim 1, wherein a focus of attention of cutting skill is on squares so as not to break an original order of the squares, and a fourth one of the twenty cutting rules is explained as follows:

the focus of attention during cutting is a key process of cutting, which has a direct influence on the accuracy of cutting the squares;

when cutting a corner, the focus of attention is that: it should be the square which is located closest to the corner, in consistent with the cutting rule, and there is only one qualified code with a largest number of strokes, that is: the focus of attention is on the square;

it will cause misjudgement when the focus of attention is put on the strokes;

focus of attention when cutting is put on the strokes if straight cutting is preemptively used without considering the original squares-cutting order, the code which is far away from a cutting corner will be mistakenly cut, including: a second code of the Chinese character 幾 will be ` which is exposed out of , the second code of the Chinese character 贵 will be ⼀ which is exposed out of ⺁, the code of ヽ in a middle of a lower part of the Chinese characters 氏一, 低 will be mistakenly cut without remembering to cut the code ノ with more strokes;

target to be cut: focus of attention is on the square which is closest to the cutting corner, the square only takes a best fit (qualified) code with the largest number of strokes;

here follows are six examples of three steps:

the stroke 丿 of the Chinese characters 卯一, 卵一, 剿, 鄉一, 曌, according to the cutting rule No. 15: the tail of the stroke 丿 should be pulled straight a little, which causes the square of the 丿 moves out of the cutting scope of the lower left corner, and as a result, a third code taken by the lower left corner cutting will be the stroke ノ or ㄥ一, ㄥ, which is square located closest to the lower left corner;

normal cutting rule: the lower left and right corner cuttings to the last stroke ㇗ are vertical cuttings which are made to take the third code ㇐ and the fourth code ㇆, this cutting is consistent with the correct cutting rule;

if the tail of the stroke ㇆ is bent to the lower left corner to become ㇆, plus it is a red code, then curved cutting is used to take the third code ㇆, and a fourth code ㄥ, this is another inaccurate result;

two different results appear due to different ways of writing, and such amphibolous results are not allowed;

therefore, the cutting rule No. 12 is added to solve the above problem, the remanent stroke ㇗ is cut into two parts ㇐ and ㇆ which are arranged in an up-and-down manner and a horizontal interval appears between the ㇐ and ㇆, so that the remanent stroke of the third code becomes: ▣, the red code ㇆ should use the curved cutting in the first place and now changes to use horizontal cutting, and as a result, the third code is still ㇆, and the fourth code is ㇐, putting an end to the two amphibolous results;

the different Chinese characters 丂一, 号 have the same remanent stroke ㇗ by using different corner cuttings, namely, vertical cutting or horizontal cutting;

after the first cutting to the Chinese characters 赍一, 賫 is made by curved cutting to take the first red code 土, please note that the second code can absolutely not be made by vertically cutting an exposed right arm, namely the stroke ㇆, from the right side of the 赍一, 賫, such cutting method will completely break the original order of the squares;

if the second code of an upper right corner of the Chinese character 幾 is taken by vertically cutting the stroke ヽ exposed out of ⼽, it will break the original order of the squares, let alone that the ⼽ is a red code which is not allowed to be far away from the cutting corner;

the right cutting is such that: the second code of the upper right corner of the Chinese character 幾 should be made by curved cutting to take the stroke ㄥ;

the third code ノ of the two Chinese character 氏一, 低 is a two-stroke code, and their fourth code ヽ is a red code which has the priority to be cut; the code ヽ is inferior to ヽ, including: 氏—— left downward stroke 撇, hook, hook, 低——人, left downward stroke 撇, , hook, hook;

the cutting to the remanent strokes 厶一, 㠯 of the second code of the Chinese characters 玄一, 幽 should be made by moving the ㄥ out of the horizontal line of the 厶 instead of vertically cutting the ヽ which is located at the right side and far away from the cutting corner including: 图, cutting the ㄥ according to three steps—a cutting rule No. 18.

4. The four-corner cut square Chinese character input method based on excellent code as claimed in claim 1, wherein a sixth one of the twenty cutting rules is explained as follows:

a downward extension from a vertical stroke in a middle of 甲一, 冂, , two different requirements on setting rules:

requirement No 1: there are other strokes below the vertical stroke in the middle of the 甲一, 冂, , and other strokes form code, the 甲一, 冂 and the code thereunder has no cutting point, and the 甲一, 冂 is separated from the code thereunder, including: 里一, ▣——水泥θ; 果一, ▣——水木θ; 甲一, ▣——水車 牛插; 男一, ▣——水月人θ;

免一, ▣——撤角排围, there is no stroke below the 冂 to form a code with the vertical stroke thereof;

requirement No.2: there is no stroke at the right side of a lower stroke of a 甲一, 甲, plus tail of a stroke is not allowed to be cut and used as a stroke, so cutting rule No. 19 has to be used to cut at the cutting point of 扌一, 扌, disengages from an upper square to become a code, including: ▣一, ▣; 挛——撇马插牛.

5. The four-corner cut square Chinese character input method based on excellent code as claimed in claim 1, wherein a seventh one of the twenty cutting rules is explained as follows:

cutting a space left by taking away a separating stroke, the separating stroke has two functions as follows:

taking away the separating stroke leaves behind a space, the function of separating the strokes at both sides and forming new code still retains, including: ▣一, ▣一, ▣一, ▣一, ▣;

the existence of separating stroke can stop the passage of cutting line:

if a separating stroke exists, its function of stopping the cutting line also exists, including: ▣一, 坐; ▣一, 亚; ▣一, 飞;

on the other hand, if the separating strokes is taken away, the function of stopping the cutting line also does not exist, including: 垩一, 囚, 兎一, ▣.

6. The four-corner cut square Chinese character input method based on excellent code as claimed in claim 1, wherein cutting rules No. 8-11 of the twenty cutting rules are explained as follows:

cutting the code with a largest number of strokes under a condition of same color and same step, including:

兼——排煤煤日; 殷——围排角插; 釁——泥人围口; 舞——竹圮竹牛;

for black codes under the condition of the same step and same number of strokes, straight cutting is prior to curved cutting, including: 瓜——口插煤马; 卯——撇围钩捺 母——马捺钩牛; 也——圮角插0;

under the condition of the same step and same number of strokes, horizontal cutting is prior to vertical cutting, including: 凸——马马马角; 必——捺捺捺 泥; 井——草捺草θ; 井——草草θ; 毋——马草角草;

where there are two cuttings in total in a Chinese character to be cut, the first cutting should cut the part of the Chinese character with the largest number of strokes, and so should the second cutting, including:

a second code with the largest number of strokes of the Chinese character 無 is 燕 (竹土煤土), the second cutting with the largest number of stroke is the 泥 code 土 码;

the second code with the largest number of strokes of the Chinese character 舞 (竹十竹牛); is 舛, the second cutting with the largest number of stroke is the 泥 code 土;

the second code with the largest number of strokes of the Chinese character 亞 (煤马煤角) is 坐, the second cutting with the largest number of stroke is the 马 code ㇆;

the second code with the largest number of strokes of the Chinese character 鹿 （立马钩坭） is 庞, the second cutting with the largest number of stroke is the 巧 code ▢;

the second code with the largest number of strokes of the Chinese character 慶 （立马水马） is 繁, the second cutting with the largest number of stroke is the 马 code ▢;

the second code with the largest number of strokes of the Chinese character 骨 （插坭月马） is 带, which is a red code 七.

7. The four-corner cut square Chinese character input method based on excellent code as claimed in claim 1, wherein cutting rules No. 12-15 of the twenty cutting rules are explained as follows:

a remanent stroke 勹 of the Chinese characters 号↙, 考 is cut by horizontal cutting instead of vertical cutting into two parts ⌐ and ⌐ which are arranged in an up-and-down manner and a horizontal interval appears between the ⌐ and ⌐, so that the remanent stroke of a third code becomes: ㅋ, so as to put an end to the two amphibolous results for the following reasons:

first, vertically cutting the remanent stroke of a second code 勹 of the Chinese character 亏, the second code takes a red code ⌐ and the third code takes the red code ⌐, this totally conforms with the twenty cutting rules;

if bending a tail of the third code 勹 of the Chinese character 亏 toward a lower left corner, two different results appear due to different ways of writing, and such amphibolous results are not allowed;

second, replacing the original curved cutting with horizontal cutting ㅋ, the third code takes the red code ⌐, and fourth code takes the red code ⌐, by putting this into the twenty rule, thus putting an end to the two amphibolous results;

cutting rule No. 12 puts an end to the two amphibolous results: the two cutting methods for the remanent stroke 勹 of different Chinese characters and different cutting corners are all applicable, including:

亏——叠角角 θ; 号——冂煤角 角; 丂——煤煤角立;
考——坭插角角; 巧——叠煤角角;

for all the codes, including 八↙, 人↙, 夂, associated with the strokes ╱ and ╲, the tails should be pressed a little upward into the flat and horizontally arranged cutting square, making the cutting square leave the below code, the red codes 八↙, 人↙, 夂 are pressed to become ▢↙, ▢↙, ▢, and are still red codes, including: 基——单乔坭排; 春——凵人凵 θ;
介——人立撇 θ; 处——竹捺立 θ; 冬——竹言 θ;

the strokes passing through the horizontal stroke, pressing the downward strokes to the left and the right that passes through the horizontal stroke into the cutting square ▢↙, ▢, so as to make a room for the cutting squares thereabove or thereunder, once entering cutting angle, the red codes 广↙, 大 have a priority to be cut, including:

考——坭插角角; 都——坭囗冂插; 老——坭插坭 θ;

cutting method of slightly pressing the 丿 (柳) rightward into the three types of squares:

stroke 丿 (柳) must satisfy one of the following three conditions:

first, the stroke 丿 (柳) is hung from the left end of a horizontal stroke, and only when the stroke 丿 (柳) extends downward to the bottom of the Chinese character, cutting can be made in the lower left corner to cut with the cutting square ⌐, including 后↙, 厅↙, 所↙, 房↙, 局;

second, the stroke 丿 (柳) is hung from the right end of a horizontal stroke, and only when the stroke 丿 (柳) extends downward to the bottom of the Chinese character, cutting can be made in the lower right corner to cut with the cutting square ▢, including 卯↙, 卵↙, 孵↙, 舞↙, 郷;

third, strokes 丿 (柳) is hung from the right end of a horizontal stroke or passes through the horizontal stroke, while the right end of the horizontal stroke has the strokes ｜↙, 丿↙, ╲↙, ⌐, including: 介↙, 鼻↙, 刀↙, 为↙, 儿↙, 无↙, 尴↙, 尬↙, 带, the 丿 which is parallel to the ｜↙, 丿↙, ╲↙, ⌐ satisfies the third condition.

8. The four-corner cut square Chinese character input method based on excellent code as claimed in claim 1, wherein cutting rules No. 16-17 of the twenty cutting rules are explained as follows:

it should be considered as separate and no cutting point when a tail of a stroke contacts the middle section of another stroke:

it should be considered as separate when an angle between the tails of two strokes is larger than 90 degrees, except for ready-made codes:

examples of ready-made codes: 后↙, 厅↙, 质↙, 質↙, 所↙, 殷↙, 房 examples of non-ready-made codes:
段↙, 印↙, 卯↙, 卿↙, 卵↙, 孵↙, 兵↙, 氏↙, 祗.

9. The four-corner cut square Chinese character input method based on excellent code as claimed in claim 1, wherein a cutting rule No. 18 of the twenty cutting rules is explained as follows:

if less than half of a stroke is covered by another stroke, the covered part of the stroke can be moved out of the horizontal cutting line and cut by straight cutting or two cuttings, including:

鼎——围角撇角; 夷——上上叠角; 县——围撒小角;
弓——煤角角立; 幺—— 角捺角 θ; 玄——言角角捺·

10. The four-corner cut square Chinese character input method based on excellent code as claimed in claim 1, wherein cutting rules No. 19-20 of the twenty cutting rules are explained as follows:

moving a single code within a code 马 cutting square which opens upward or downward out of the horizontal cutting line, the single code has a priority to be cut by straight cutting, including: 凶↙, ▢; 由↙, ▢; 曲↙, ▢; 甲↙, ▢; 申↙, ▢;

if there is a horizontal stroke covering the open end of the code 马, such as 且↙, 亘↙, 皿, this cutting rule is not applicable. The special cutting rule is designed to solve a problem caused by whether the first code is within or outside the square of code 马;

in addition to the cutting rule No. 19 which is special cutting rule for code 马, the present invention further has a normal cutting rule: including: ; 幽↙, 豎↙, 曰↙, 殴.

* * * * *